United States Patent [19]
Lewis et al.

[11] 4,010,311
[45] Mar. 1, 1977

[54] IMPACT-RESISTANT GLASS-POLYESTERURETHANE LAMINATES

[75] Inventors: Charles W. Lewis, Pittsburgh; Earl E. Parker, Allison Park, both of Pa.

[73] Assignee: PPG Industries, Inc., Pittsburgh, Pa.

[22] Filed: Sept. 14, 1973

[21] Appl. No.: 397,507

[52] U.S. Cl. .......................... 428/424; 260/75 NK; 260/75 NT; 428/425; 428/426
[51] Int. Cl.² .................. B32B 27/40; C08G 63/12
[58] Field of Search ............... 161/190; 117/124 E, 117/161 KP, 126 GR; 260/77.5 AM, 75 NP, 75 NT, 75 NK; 428/423, 425

[56] References Cited

UNITED STATES PATENTS

| | | | |
|---|---|---|---|
| 2,333,639 | 11/1943 | Christ et al. | 260/75 NK |
| 2,770,612 | 11/1956 | Schollenberger | 260/75 NK |
| 2,785,150 | 3/1957 | Kreider et al. | 260/75 NK |
| 2,871,218 | 1/1959 | Schollenberger | 260/75 NK |
| 3,373,143 | 3/1968 | Chilvers et al. | 260/75 NP |
| 3,463,758 | 8/1969 | Stewart | 260/75 NK |
| 3,620,905 | 11/1971 | Ahramjian | 161/190 |
| 3,748,315 | 7/1973 | Wooster et al. | 117/161 KP |
| 3,764,457 | 10/1973 | Chang et al. | 260/858 |
| 3,808,077 | 4/1974 | Rieser et al. | 161/190 |
| 3,823,060 | 7/1974 | McClung | 260/75 NP |

FOREIGN PATENTS OR APPLICATIONS

| | | | |
|---|---|---|---|
| 543,936 | 7/1957 | Canada | 260/77.5 |
| 1,497,772 | 9/1967 | France | |
| 849,136 | 9/1960 | United Kingdom | 260/75 NK |

OTHER PUBLICATIONS

Ezrin, "Polymer Molecular Weight" A.C.S. Advances in Chemistry Series pp. 98–107, (1973).
N. V. Seeger et al. Chemigum SL: An Elastomeric Polyester-Urethane, Ind & Eng. Chem. (vol. 45, No. 11) pp. 25, 38–42, (1953).
F. E. Chritchfield et al., "Thermoplastic Urethane Elastomers," Rubber World, pp. 61–65, Aug. 1971.

*Primary Examiner*—George F. Lesmes
*Assistant Examiner*—R. J. Roche
*Attorney, Agent, or Firm*—Irwin M. Stein

[57] ABSTRACT

Laminated articles of at least one sheet of relatively rigid, transparent material, e.g., glass, and polyesterurethane sheet are described. Such laminates, e.g., a bilayer assembly of one glass sheet with an adhered sheet of polyesterurethane or a trilayer assembly of two glass sheets with an interlayer of polyesterurethane sheet, are useful in safety glass applications, e.g., automobile windshields, and automobile side and rear windows. The polyesterurethane is preferably the reaction product of a cycloaliphatic diisocyanate and a relatively low molecular weight hydroxy-terminated aliphatic polyester, e.g., the esterification product of an aliphatic dibasic acid and an aliphatic diol.

21 Claims, No Drawings

IMPACT-RESISTANT GLASS-POLYESTERURETHANE LAMINATES

DESCRIPTION OF THE INVENTION

Laminated glass articles are used widely, especially in automobile windshields, aircraft glazing and the like. A common term applied to such laminates, particularly when used in automobiles, is "safety glass". Safety glass comprises a glass sandwich of a plastic interlayer material that rests between and bonds together two or more sheets of glass with such adhesion between the glass and the interlayer material that the breaking of the glass results in a minimum dispersion of fragments of broken glass. The laminate can be fabricated from alternating glass-plastic interlayer sheets depending on the ultimate laminate thickness desired. Various types of plastic sheet material can also be used in combination to prepare transparent laminates.

Plasticized polyvinyl butyral is commonly used as the interlayer material for safety glass because of its adhesion to glass when laminated under suitable temperatures and pressures, because it is transparent when bonded between two sheets of glass, and because of its resistance to rupture whenever an object impacts such safety glass. More recently, polyurethanes have been proposed for use as an interlayer material in laminated glass articles. See, for example, U.S. Pat. Nos. 3,620,905, 3,509,015, and 3,388,032. The polyurethane interlayer materials can be utilized as pre-formed sheets or can be cast in place.

Polyurethanes are commonly produced by the reaction of a polyol having a relatively high number average molecular weight, e.g., from about 1000 to about 3300, an active hydrogen compound containing at least two active hydrogens per molecule reactive with isocyanate groups and having a molecular weight typically substantially less than the polyol, e.g., less than 250, and a polyisocyanate, e.g., a diisocyanate. As the polyol, hydroxy-terminated polyesters, polyethers and polycarbonates have been described as being useful.

It has now been discovered that optically clear laminates, e.g., glass laminates, having excellent impact resistant properties and therefore safety advantages, can be prepared using polyesterurethanes that are prepared without added amounts of an active hydrogen compound and that are the reaction product of a relatively low molecular weight polyester polyol and a cycloaliphatic diisocyanate. More particularly, it has been discovered that polyesterurethanes that are the reaction product of hydroxyterminated polyester composition having a number average molecular weight of between about 500 and about 800 and a substantially stoichiometric amount of cycloaliphatic diisocyanate can be used to produce optically clear laminates, notably glass laminates, with the aforementioned properties. Exceptional safety advantages result when the polyesterurethane is used in a bilayer, e.g., glass-polyurethane, assembly. When used, for example, in an automobile windshield, the glass portion of the aforementioned bilayer assembly is placed on the outboard side of the windshield, thereby minimizing lacerative injury to the occupants of the automobile. The aforementioned polyesterurethanes can also be used with advantage in a trilayer, e.g., glass-polyurethane-glass assembly, and in laminates composed of multiple plies of glass with various plastic sheet materials.

DETAILED DESCRIPTION

Polyester compositions useful in preparing polyurethanes that can be used to prepare the above-described essentially optically clear laminates are essentially linear, hydroxy-terminated polyesters having a number average molecular weight of between about 500 and about 800, particularly between 500 and 650. More preferably, the polyesters are aliphatic polyesters having a number average molecular weight of between about 520 and about 585, which are prepared by esterification of an aliphatic dicarboxylic acid, or anhydride thereof, with an aliphatic polyhydric alcohol, e.g., an aliphatic diol. The number average molecular weight of the polyester compositions useful in the present invention can be determined by hydroxyl end group analysis and by the following formula:

$$\text{No. Ave. Mol. Wt.} = \frac{(\text{functionality of the polyester})\,(56.1)\,(1000)}{\text{hydroxyl (OH) number of the polyester}}$$

In most cases, the functionality of the polyester is 2. Since the number average molecular weight of the above-described polyesters can range from about 500 to about 800, particularly from 500 to 650 and preferably from about 520 to about 585, the hydroxyl number of the polyester will range accordingly from about 140 to about 225, particularly from 170 to 225, and preferably from about 190 to about 215.

Polyesters are prepared by well-known esterification techniques of saturated dicarboxylic acids or anhydrides thereof (or combinations thereof) and polyhydric alcohols. Such polyesters and their manner of preparation are well known to the polyester chemist. As used herein, the term "polyester" is intended to include polylactones, e.g., polycaprolactones and polyvalerolactones, which can be prepared by polymerizing a lactone, such as epsilon caprolactone and delta-valerolactone, in the presence of minor amounts of difuctional active hydrogen compounds, such as water or a low molecular weight glycol, e.g., 1,4-butane diol.

Aliphatic dicarboxylic acids suitable for preparing polyester compositions useful in the present invention can be represented by the formula:

$$\text{HOOC} - \text{R}' - \text{COOH} \tag{1}$$

wherein R' is an alkylene radical containing from 2 to 8 and preferably from 4 to 7 carbon atoms inclusive. Thus, the dicarboxylic acids contain from 4 to 10 and preferably from 6 to 9 carbon atoms. Examples of such dicarboxylic acids include: succinic acid, glutaric acid, adipic acid, pimelic acid, suberic acid, azelaic acid, and sebacic acid. The corresponding anhydrides can also be used. Adipic and azelaic acid are preferred. Mixtures of dicarboxylic acids also can be used.

The polyhydric alcohols utilized in the preparation of the polyester compositions of the present invention are preferably aliphatic alcohols containing at least two, and preferably only two hydroxy groups, e.g., straight-chain glycols, containing from 4 to 8 carbon atoms. The glycols contain hydroxyl groups preferably in the terminal positions and straight chain diols can be represented by the formula:

          II wherein x is a number ranging from 4 to 8.

Examples of suitable diols include 1,4-butanediol, 1,3-butanediol, 1,5-pentanediol, 1,6-hexanediol, 1,7-heptanediol, and 1,8-octanediol. The preferred diol is 1,4-butanediol. Mixtures of polyhydric alcohols can be employed. Only small amounts of trifuctional alcohols, such as glycerol or trimethylol propane should be present in order to decrease the possibility of extensive cross-linking since the preferred polyesters of this invention are essentially linear. Preferably, no trifunctional alcohols are present.

Preparation of the polyester compositions of the present invention are esterification of aliphatic saturated dicarboxylic acids, or anhydrides thereof, with polyhydric alcohols are well-documented in the literature. Typically, the acid or its anhydride and the alcohol are reacted together by heating a mixture of the reactants at 210° C. or below, depending on the amount and boiling point of the glycol used in the esterification process. The amount of acid and alcohol used will vary and depend on the molecular weight of the polyester desired. Since the polyesters preferred for the present invention are hydroxyl terminated, a stoichiometric excess of alcohol is used, i.e., more than one mole of alcohol (diol) per mole of dicarboxylic acid, to obtain linear chains containing a preponderance of terminal hydroxyl groups.

Generally, the esterification reaction is conducted with an esterification catalyst, such as butyl stannoic acid, p-toluene sulfonic acid, stannous octoate, tetrabutyltitanate, dibutyl tin dilaurate, dibutyl tin oxide, stannous chloride, stannous fluoride and stannous oxalate. Any esterification catalyst that is soluble in the reaction mixture can be employed; but, it is desirable that the catalyst used be of such a character that is has no deleterious effect in the final polyester product. The amount of esterification catalyst employed is that amount, i.e., a catalytic amount, which accelerates the esterification reaction to the desired degree. Commonly, from 0.001 to about 0.1 weight percent, e.g., about 0.02 weight percent, based on the reactants is used.

The esterification reaction is generally conducted under a protective, non-oxidizing, i.e., inert, atmosphere, such as an atmosphere of carbon dioxide or nitrogen gas. The use of an inert gas atmosphere helps to prevent darkening of the polyester or to make it possible to obtain a pale or colorless polyester product. Bubbling the inert gas through the reaction medium serves the added functions of agitation and of expediting the removal of water formed by the reaction.

Water of esterification is removed from the reaction mixture by heating the mixture to a preselected reaction temperature. The condensation equipment associated with the reactor is designed to retain the reaction components while permitting the removal of water. The temperature of the reaction mixture rises as the glycol is consumed in the esterification process. When the reaction mixture reaches about 210° C., the mixture is cooked at that temperature until the molecular weight reaches the desired level. In the use of hydroxyl terminated polyesters, an acid number of 1.0 or less is commonly obtained. After the polyester has reached the desired molecular weight, the polyester is permitted to cool to room temperature.

In preparing the above-described essentially linear, hydroxylterminated polyesters, most of the excess glycol used in the esterification reaction is distilled from the polyester reaction mixture. However, removal of all of the unreacted glycol remaining in the polyester is difficult. Generally, the lower the molecular weight of the polyester, the more residual unreacted glycol will remain in the polyester. The amount of residual free glycol in the polyester composition can be reduced from the amount normally present by subjecting the composition to high vacuum (10 mm. Hg. or less) distillation. Therefore, polyesters used to prepare the polyurethanes of the present invention will commonly contain some residual unreacted glycol (free glycol). Generally, the amount of free glycol remaining in the polyester will be less than about 7 weight percent, based on the polyester, and preferably is less than 6, e.g., less than 5.5 weight percent. The number average molecular weights and hydroxyl numbers described hereinbefore are based on end group analysis of polyester composition containing such free glycol.

The polyester compositions useful in the present invention and prepared in the above-described manner will, as indicated, have a number average molecular weight of between about 500 and 800. It is understood that this is a number average and that the polyester composition is composed of a great number of different molecules of varying length, i.e., from the free glycol to a high molecular weight polyester, in a normal distribution. For example, a polybutylene adipate of 550 number average molecular weight will have molecular species contained in it ranging from unreacted residual butanediol (molecular weight 90) to polybutylene adipates of 3000 molecular weight or higher; but, with the principal constituents of the composition (in weight) being in the near vicinity of 550 molecular weight to achieve that number average molecular weight.

Polyesterpolyols from lactones can be prepared by subjecting a lactone representable by the formula,

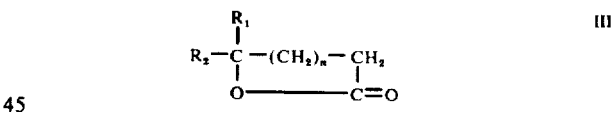          III wherein $R_1$ and $R_2$ are each hydrogen, alkyl or cycloalkyl, of 1 to 10 carbon atoms and $n$ is an integer from 1 to 3 to polymerization in the presence of minor amounts of water or a low molecular weight glycol such as ethylene glycol, diethylene glycol, triethylene glycol, 1,4-butanediol, propylene glycol, 1,6-hexanediol, etc. The ring opening and polymerization of lactones is generally effected at temperatures between 50° and 300° C. and preferably in the presence of a catalyst. Preparation of polylactones are well known in the polyester art. See, for example, German published application No. 1,217,019 and U.S. Pat. 3,726,887. Suitable lactones include, caprolactones, wherein n is equal to 3, valerolactones, wherein $n$ is equal to 2, and butyrolactones, wherein $n$ is equal to 1, and such lactones with substituents on the omega carbon atom, such as monoalkyl, e.g., methyl and ethyl substituted lactones, dialkyl, e.g., dimethyl and diethyl substituted lactones, cyclohexyl substituted lactones, etc. The preferred lactones are epsilon - caprolactone and delta-valerolactone, wherein $n$ is equal to 3 and 2 respectively and wherein $R_1$ and $R_2$ are hydrogens.

The above-described polyesters can be represented by the following formulae:

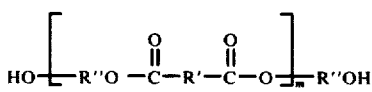

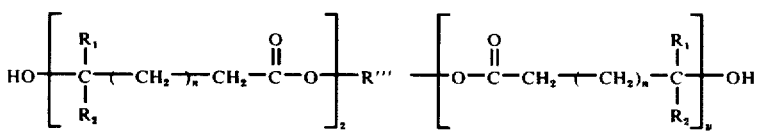

wherein R" is the alkylene portion of the glycol used to prepare the polyester, R' is the alkylene portion of the dicarboxylic acid (or anhydride) and m is a number that ranges principally from 0 to 15 or more. Thus, the polyester composition will be composed of a normal distribution of molecules with the predominant number of molecular species by weight represented by those when m varies from 1 to 4. The amount of molecules present when $m = 0$, i.e., the free glycol, ordinarily will be such that the weight percent of free glycol is no more than about 7 weight percent.

In formula V, which represents the polylactones, n is an integer of from 1 to 3, $R_1$ and $R_2$ are each hydrogen, alkyl, or cycloalkyl of from 1 to 10 carbon atoms, preferably $C_1$–$C_4$ alkyl, R''' is the alkylene portion of the glycol used to ring open the lactone and the sum of $y + z$ ranges principally from 0 to 30 or more, with the predominant molecular species by weight represented by those wherein the sum of $y + z$ ranges from 1 to 8 and most predominantly from 3 to 4. Naturally, the sum of $y + z$ must be such that the same number average molecular weight of the polylactone, as determined by hydroxyl end group analysis, is obtained.

Examples of preferred polyesters include poly(butane diol-1,4 adipate), poly(butane diol-1,4 succinate), poly(butane diol-1,4 glutarate), poly(butane diol-1,4 pimelate), poly(butane diol-1,4 suberate), poly(butane diol-1,4 azelate), poly(butane diol-1,4 sebacate) and poly (ε-caprolactone).

The cycloaliphatic diisocyanate used to prepare the polyesterurethanes of the present invention can be mono - or dinuclear, i.e., contain one or two cycloaliphatic rings in the compound. The cycloaliphatic diisocyanates are significantly more stable to ultraviolet (UV) light than the aromatic diisocyanates, such as toluene diisocyanate and methylene diphenyl diisocyanate (MDI) and, therefore, UV light stabilizers are generally not required in preparing the polyurethanes of the present invention. In addition, cycloaliphatic diisocyanates produce polyurethanes with relatively high levels of impact energy absorption, which makes the polyurethanes useful for safety glass applications.

The cycloaliphatic diisocyanate employed to react with the above-described polyester is preferably a dinuclear compound, i.e., a compound containing two cycloaliphatic rings connected by an alkylene group of from 1 to 3 carbon atoms or a lower alkyl ($C_1$–$C_4$) substituted alkylene group, e.g., an isopropylidene group. The cycloaliphatic diisocyanates useful in the present invention can be substituted with other groups, such as the nitro, halogen, e.g., chlorine, alkyl, alkoxy, etc. groups, that are not reactive with the hydroxyl groups of the polyester polyol and that do not render the isocyanate group unreactive. Examples of suitable diisocyanates include: 4,4'-methylene-bis-(cyclohexyl isocyanate), hydrogenated toluene diisocyanate (including hydrogenated products of: a. the 2,4-isomer; b. the 2,6-isomer; c. the 80/20-2,4-/2,6-isomer mixture; and d. the 65/35-2,4-/2,6-isomer mixture), 4,4'-isopropylidene-bis-(cyclohexyl isocyanate), 1,4-cyclohexane diisocyanate, 4,4'-dicyclohexane diisocyanate, and 3-isocyanato methyl-3,5,5-trimethylcyclohexane diisocyanate (IPDI). Mixtures of the aforementioned diisocyanates also can be used. The cycloaliphatic diisocyanates reactant can include minor amounts, i.e., less than 1 weight percent, of other diisocyanates such as toluene diisocyanate (TDI), diphenylmethane diisocyanate (MDI), and other aromatic diisocyanates provided that the amount employed is carefully regulated to avoid yellowing, translucence, and reduced impact resistance of the polyurethane product.

The preferred cycloaliphatic diisocyanate is 4,4'-methylene-bis-(cyclohexyl isocyanate), which is hydrogenated MDI. This diisocyanate is commercially available in different steroisomer ratios. Since each isocyanate functional group can be either cis or trans to the bridging methylene group of the compound, the product can be composed of various cis-cis, cis-trans, and trans-trans isomers. The isomer ratio is controlled by procedures used to prepare the diisocyanate. One such product sold by the E. I. duPont de Nemours and Company under the trademark "Hylene W" has a total stereoisomer ratio of about 55 percent trans and about 45 percent cis isomers. This material ordinarily will have a trans-trans isomer content of about 19 to 21 percent, a cis-cis isomer content of from 17 to 18 percent and a cis-trans isomer content of from about 62 to 64 percent. This diisocyanate can also contain a minor amount of monoisocyanate, e.g., from about 0.27 to about 0.40 percent. The same diisocyanate compound is also sold by the Allied Chemical Company under the trademark "Nacconate H-12" in a stereoisomer ratio of about 30 percent total cis isomers.

The amount of cycloaliphatic diisocyanate used to react with the polyester polyol to form the polyesterurethane will depend on the amount of polyester used and the amount of residual free glycol, if any, present in the polyester composition. Typically, the number of moles of diisocyanate used will equal substantially the sum of the moles of polyester plus the moles of residual free glycol, if any, present, i.e., a stoichiometric amount, so that there is essentially complete reaction of the diisocyanate and the glycol. The polyesterurethane reaction product is therefore, substantially free of isocyanate groups, i.e., the product contains less than 0.3 weight percent and preferably less than about 0.08 weight percent isocyanate groups. While it is preferred that the molar amount of polyester polyol and free glycol combined reacted is substantially stoichiometrically equivalent to the molar amount of cycloaliphatic diisocyanate, a slight excess of unreacted hydroxyl group or isocyanate groups in the polyesterurethane reaction product can be tolerated. Thus, an isocyanate:hydroxyl ratio in the reaction mixture of from about 0.95:1 to about 1.05:1 can be used.

In preparing the polyesterurethanes of the present invention, the diisocyanate compound and the polyester polyol are heated until free flowing and mixed in a suitable vessel until the liquid mixture of reactants is homogeneous. Mix temperatures of from about 100°–120° F. have been found suitable with mixtures of poly(butane diol-1,4 adipate) having a number average molecular weight of about 540 and 4,4'-methylene-bis-(cyclohexyl isocyanate). At these temperatures, the pot life of the mixture is relatively long, e.g., as long as about 8 hours. The reactant mixture is than placed in an oven maintained at temperatures of from the mix temperature up to 300° F. for curing. Curing is continued until the polyurethane product contains substantially no unreacted isocyanate groups, as discussed heretofore. For the above mentioned products, a cure time of about 6 hours at 290° F. is suitable. Depending upon the temperature, cure times can vary from about 2 hours to 24 hours. The cure time and/or cure temperature can be reduced by adding a urethane-forming catalyst to the reaction mixture.

Suitable urethane-forming catalysts are those materials that are specific for the formation of urethane structure by the reaction of the —NCO group of the diisocyanate and —OH group of the polyesterpolyol (and residual glycol) and which have little tendency to induce size reactions leading to allophanate and isocyanurate formation. For these reasons, catalysts such as stannous salts of organic acids and organo tin compounds are preferred. Illustrative catalysts include: stannous octoate, stannous oleate, dibutyl tin diacetate, butyl stannoic acid and dibutyl tin dilaurate. The amount of catalyst used in any particular system can be determined routinely by one skilled in the art. Amounts of from about 0.0005–0.02 parts of catalyst for one hundred parts of the polyesterurethane-forming ingredients can be used. The amount of catalyst needed, of course, depends on the curing temperature used. Catalysts, other than the preferred tin catalysts, which are useful for the formation of urethanes can, of course, be used.

The urethane-forming reactants are preferably mixed in a moisture-free atmosphere, such as a nitrogen atmosphere, to prevent moisture contamination, thereby avoiding the reaction of the isocyanate reactant with moisture present in the atmosphere. When the reaction is conducted in the absence of a catalyst, an oxygen-free atmosphere is also preferably employed to prevent significant surface discoloration of the polyurethane reaction product.

After the urethane-forming reaction is substantially complete, the polymer can be transferred to an extruder and extruded, and/or milled and calendered to the desired thickness or the partially polymerized product can be further polymerized in the forming equipment. Alternatively, the polyurethane product can be prepared in suitable trays preferably coated with a suitable coating so that the polyurethane does not adhere to the tray and allowed to harden into blocks. Suitable coating materials are perfluorinated hydrocarbons such as Teflon or a sheet material such as Tedlar. The blocks can then be broken into granules in conventional granulators, blended and extruded to form polyurethane sheet.

The extruded polyurethane sheet is usually coated with a powder, such as sodium bicarbonate, in order to prevent adjacent sheeting from adhering. Rolls of the polyurethane sheet material are also commonly encased in a non-adherent protective material such as polyethylene to exclude dust. Prior to being used as a laminating material, the polyurethane sheet is unrolled and cut into the desired size, washed and dried. The moisture content of the polyurethane is controlled prior to lamination by drying in an oven at a temperature between about room temperature and about 120° F. for from a few hours up to three days or more. The polyurethane sheet is then placed with the other materials forming the laminate, e.g., the glass sheet, to form the desired laminate.

The polyesterurethanes of the present invention are amorphous, transparent, thermoplastic polymers, which are optically clear when used in laminates in thin sections, e.g., from 10 to 60 mils. They are essentially non-tacky at room temperature. These polyesterurethanes have a urethane content, based on the urethane linkage (NHCOO), over total weight, of from about 10 to about 20 percent more often between 13 and 16 percent. They are resistant to shock and impact and, when incorporated as part of a laminated window, e.g., a glass laminate, impart penetration resistance to the laminate over a wide temperature range. This property is important for safety glass applications. They can be characterized as viscoelastic, that is, they do not recover quickly nor completely when an applied stress is released, as is the case with a true elastomer.

The polyesterurethanes of the present invention have good weatherability properties, as indicated by Weather-Ometer and Fade-Ometer accelerated tests, i.e., they are hydrolytically stable and are stable to ultraviolet light (do not discolor).

Although the polyesterurethanes of the present invention are particularly applicable for use in preparing glass laminates, i.e., at least one sheet of glass and at least one sheet of the polyesterurethane, they are similarly useful in preparing transparent laminates which are fabricated from rigid, transparent plastic materials in place of or in addition to the glass sheet. Suitable examples of such plastic materials include polycarbonates, polyacrylates, polyesters and the like. The preparation of such plastic materials are well known in the art and do not represent a part of the present invention.

Polycarbonates that can be used to prepare transparent laminates with the above-described polyesterurethanes are those such as described in U.S. Pat. Nos. 3,028,365 and 3,117,019, and are preferably prepared by reacting bis(monohydroxyaryl) alkanes with phosgene or bischloroformate esters of bis(monohydroxyaryl) alkanes. Stretched acrylics, such as poly(methyl methacrylate), poly(methyl alphachloroacrylate) and the like can be produced by stretching the polymer on apparatus disclosed in U.S. Reissue Pat. No. 24,978 to Bottoms et al. Other suitable acrylate and polyester resins useful herein are of the type mentioned in U.S. Pat. No. 3,009,845 to Wiser.

Although the polyesterurethanes of the present invention are abrasion resistant and tough, i.e., they do not propogate a cut easily, when they are employed as an exposed layer in a transparent rigid laminate, e.g., as a bilayer glass laminate, the surface can be coated with a thin protective coating to prevent surface damage to the polyesterurethane such as from severe abrasion, scratching, corrosive liquids and other surface marring effects. The protective coating can be any of the abrasion resistant transparent coatings known to those skilled in the art for application to glass or plastic materials used in place of glass.

Examples of suitable protective coatings useful with the laminated articles described herein include, a polymerized layer of a silicone, the latter being a product of the hydrolysis of an organosilicon composition having the general formula $RmSiX_{(4-n)}$, wherein R is an aliphatic or aromatic hydrocarbon radical, X is a hydrolyzable radical, such as a halogen, e.g., chlorine, atom or an alkoxy radical, and n is a number of 0 to 2. In this regard, see South African Pat. No. 72/2635 for Laminated Glass Sheets filed in the name of Blank et al. Silicon containing solutions can be applied to organic plastics to provide scratch resistant coatings as described in U.S. Pat. Nos. 2,404,357, 2,404,426 and 2,440,711. Also useful are compositions comprising polysilicic acid and copolymers of fluorinated monomers with omega-hydroxyaliphatic vinyl esters, e.g., copolymers of tetrafluoroethylene and 4-hydroxybutyl vinyl ether (U.S. Pat. No. 3,429,845); the next preceding described compositions containing, in addition, a block copolymer of lower alkylene oxide and dimethyl siloxane (U.S. Pat. No. 3,476,827); and other polysilicic acid compositions as described in U.S. Pat. Nos. 3,429,846, 3,390,203, and 3,514,425. The protective coating can be of any suitable protective thickness, e.g., from about 0.1 to 20 microns.

In the preparation of laminated glass articles using the polyesterurethane compositions described hereinbefore, any well-known commercial plate, float or sheet glass composition or any other clear, low colored, transparent type of glass generally used in window applications is suitable for use as the glass sheet or ply. Particularly suitable compositions are the well-known silica type of glass, particularly soda-lime-silica glass, which can include or exclude a glass tinting composition such as about ½ percent of iron oxide. The glass can be strengthened by either thermal or chemical tempering. The thickness of the sheet of glass can, of course, vary; but, is preferably between about 0.01 and about 0.18 inches thick.

Commercial soda-lime-silica glass typically has the following composition:

| COMPONENT | WEIGHT PERCENT |
|---|---|
| $Na_2O$ | 10–15 |
| $K_2O$ | 0–5 |
| CaO | 5–15 |
| $SiO_2$ | 65–75 |
| MgO | 0–10 |
| $B_2O_3$ | 0–5 |

A typical analysis of a soda-lime-silica glass has the following composition:

| COMPONENT | WEIGHT PERCENT | USUAL VARIATION, WEIGHT PERCENT |
|---|---|---|
| $SiO_2$ | 71.38 | 71–74 |
| $Na_2O$ | 12.76 | 12–14 |
| $K_2O$ | 0.03 | 0–1 |
| CaO | 9.67 | 8–12 |
| MgO | 4.33 | 2–5 |
| $Na_2SO$ | 0.75 | 0.1–1.0 |
| $Fe_2O_3$ | 0.15 | 0.1–1.0 |
| $Al_2O_3$ | 0.81 | 0.1–1.0 |

The polyesterurethane layer adhered to glass sheet can also vary, depending on the ultimate use. Typically, the polyesterurethane layer will vary between about 5 mils and 120 mils or more. In the case of automobile and other vehicle windshields, the polyesterurethane layer can vary between about 15 and about 60 mils. When used as the middle layer in a trilayer glazing assembly, the polyesterurethane layer is typically between about 30 and 45 mils. Thicker layers of polyesterurethane sheet can be used in a bilayer assembly, i.e., where the inner (inboard) ply of glass is omitted. The polyesterurethane layer should be of substantially uniform thickness across its entire expanse to avoid differences in refraction. The thickness variation from edge to edge should be no more than ± 5 mils, preferably no more than ± 2 mils. Moreover, the rate of change in thickness within the layer should be sufficiently small to produce a diopter of less than 0.006 to avoid visible optical distortion due to variations in refraction.

Laminated articles, e.g., glass laminates, of the present invention provide good visibility and have good optical properties, thereby having utility in window-type applications, e.g., as in automobile and other vehicle windshields, and side and back lights. Such laminates will meet the standard requirements of minimum light transmission of 70 percent, usually 86.5 percent or more, (Illuminant A, Tungsten Lamp 2840° K) and less than 2 percent haze (ANSI Code Z-26.1, 1966 Test No. 18). Glass laminates of the present invention will also have a maximum light transmittance loss of no more than 2.3 percent for every 0.1 inch thickness of the laminate. Where several plies of glass and plastic materials are used, such as in aircraft glazing units, the overall glass laminate will have a maximum light transmittance loss of no greater than 1.5 percent for every 0.1 inch of laminate thickness.

In some glazing units, such as a bilayer assembly, an adhesion promotor may be necessary to promote and maintain the adhesion between the outer glass ply and the polyesterurethane ply. Suitable materials that can be used as an adhesion promotor include the various alkoxy silanes, such as gamma-aminopropyltriethoxysilane, sold by Union Carbide Corporation under the trademark "A-1100" and by Dow Corning Corporation under the trademark "Z-6020"; N-beta-amino ethyl gamma-aminopropyltrimethoxysilane, sold by Union Carbide Corporation under the trademark "A-1120"; and glycidyl-oxypropyltrimethoxysilane sold by Dow Corning Corporation under the trademark "Z-6040". The adhesion promoter can be incorporated into the polyesterurethane forming reactant materials, i.e., the polyesterpolyol or the diisocyanate, or it can be applied externally to the glass or polyesterurethane sheet surface, i.e., the surfaces of the glass and polyesterurethane which are in contact, and preferably, the adhesion promoter is applied to the glass surface.

In some cases, such as when the polyesterurethane layer is cast in place, an adhesion controlling agent or inhibitor may be necessary to reduce the level of adhesion between the polyesterurethane and the glass. Control of adhesion is necessary to provide the proper diaphragm action and glass retention properties for safety glass application. Examples of adhesion inhibitors are alkyl acid phosphates, which are disclosed in Canadian Pat. No. 861,469. Examples of alkyl acid phosphates are the $C_1$–$C_{18}$ alkyl acid phosphates, e.g., methyl acid phosphate, n-propyl acid phosphate, n-butyl acid phosphate, lauryl acid phosphate, and stearyl acid phosphate.

The amount of adhesion promoters or inhibitors will, of course, vary depending on the degree of adhesion desired. If very high adhesion is desired, a large amount of adhesion promoter will be used. In the case of a glass laminate prepared by the cast in place method, no adhesion promoter may be necessary. On the other hand, when low or lower adhesion is desired, an adhesion inhibitor can be used. In some instances, it is desirable to control the adhesion of the polyurethane ply to the glass ply by using both an adhesion promoter and an adhesion inhibitor.

The amount of adhesion promoter typically used will vary between about 0.05 and about 0.5 weight percent based on the total formula weight when the promoter is incorporated into the polyesterurethane forming reactants. Adhesion promoting amounts of between about 0.15 and about 0.25, e.g., 0.20, weight percent are preferred. The adhesion inhibitor can be used in amounts of between about 0.00001 and about 0.15 weight percent based on the total formula weight, as heretofore described. Preferred are amounts of between 0.01 and about 0.1 weight percent. In the case of bilayer glass laminates, an amount of between about 0.02 and about 0.05 weight percent has been found to be advantageous.

To fabricate safety glass laminates of the invention, laminating can be conducted with a preformed polyurethane sheet or with the reactive ingredients. Laminating with a preformed plastic sheet is conducted in two stages, a first "prepressing" stage and a second "autoclaving" stage. The prepressing stage can be performed using rubber tubing edge channels, as described in U.S. Pat. No. 2,948,645. In this method, a matching pair of thin glass sheets are assembled with the preformed polyurethane sheet therebetween to form a sandwich structure. The sheets of glass can either be annealed or tempered. To fabricate a bilayer laminate, the interior surface of one of the glass plates is coated with a release agent which will permit the polyurethane interlayer material to release easily from the glass upon completion of the lamination. The release material must be able to withstand the temperatures and pressures of the subsequent laminating operation and should be substantially inert with respect to the plastic interlayer material. Further, the release material should not induce any optical distortion at any time in the plastic interliner surface. Suitable release agents which meet the above requirements are, for example, polyvinylfluoride, polyvinylidene fluoride, fluorinated ethylene-propylene copolymers and polytetrafluoroethylene, the latter being commercially available from E. I. duPont de Nemours and Company under the trademark TEFLON. Other suitable release agents include films of poly(ethylene glycol terephthalate), sold under the trademark MYLAR.

After the sandwich structure has been assembled, a rubber channel is fitted around the marginal edge of the sandwich and connected to a vacuum source. The prepressing operation is performed at a temperature of about 225° to 300° F. for about 10 to 15 minutes using a vacuum of about 26 to 28 inches of mercury. This prepressing operation removes air between the plies of glass, the plastic interlayer material and the release material (if used), thus permitting subsequent lamination to take place without the development of air bubbles at the glass-polyesterurethane surface. Another method of "prepressing" involves using modification of the so-called "vacuum bag technique" as generally described in U.S. Pat. No. 3,311,517. In this method, the sandwich construction is placed in a plastic bag, for example, a silicone rubber bag, which is inserted in an oven. With the exception of an air exhause valve, the bag is then sealed to form an air-tight closure. The bag is evacuated through the air exhaust valve for about 5 minutes at a vacuum of about 25 to 28 inches of mercury. Temperature of the oven is then increased to about 300° F. and the temperature and vacuum held from 7 to 10 minutes to prepress the samples.

After all the air has been removed from the glass-plastic innerface by prepressing, the prepressed glass-plastic-glass assemblies are then introduced into an oil or air autoclave or other suitable high pressure equipment and heated to a temperature of about 250° to 375° F. and at a pressure between 50 and 250 pounds per square inch for about 45 minutes to 2 hours to laminate the assembly. Autoclave conditions will depend upon the particular polyesterurethane employed. Pressures of about 200 pounds per square inch at 275°–300° F. for 45 minutes are typical. The temperature of the oil is then reduced to about 150° F., the pressure is released and the laminated assembly removed from the autoclave. In the case of a bilayer assembly, the glass mold (the glass sheet having the release agent) is separated from the rest of the assembly. The resulting bilayer has an exposed polyesterurethane surface that is smooth and free of surface markings inside the frame.

The polyesterurethane can also be adhered to a rigid material, e.g., plastic or glass sheet, by casting it against the material surface and curing the polyesterurethane in place. It has been found that when laminated articles are prepared in this manner, a particularly strong bond is effected at the polyesterurethane-rigid material interface. The casting and curing-in-place technique essentially involves pouring or pumping the uncured or partially cured resinous polyurethane into a casting cell which, in the case of glass laminates, consists of two spaced-apart glass sheets. If a motor vehicle windshield is to be fabricated, the glass sheets are bent, if required, and matched to one another. Glass bending matched pairs of glass sheets is well known in the art and can be done by the gravity-sagging technique as described in U.S. Pat. No. 3,248,196 and also by the "press bending" technique as described in U.S. Pat. No. 3,136,618. The matched pairs of bent glass sheets are held in a spaced-apart relationship by an adhesivespacer element which is positioned between and around the perimeter of the glass sheets. A suitable spacer-adhesive element is, for example, a ¼ inch wide strip of 10 to 75 mils thick foam polyurethane tape which is commercially available from the Minnesota Mining Manufacturing Company. The thickness of the foam tape will determine the thickness of the polyesterurethane ply, and thicker and thinner tapes are commercially available. The foam tape strip is continuous except where it is tightly butt-joined at the four corners of the windshield and except for about a 4 to 8 inch wide space near the center of one of the longer windshield edges which is devoid of foam tape to provide an opening for filling the casting cell with liquid resin. The foam polyurethane tape is an open cell foam and allows the air from the interior space of the cell to exit at any point along the edge while the cell is filling, but does not allow passage of any liquid resin.

In the preparation of bilayer laminates, one interior surface of the casting cell should be coated with a release agent so that after the resinous polyesterurethane material has been cast and cured in place, the interior surface with the release agent can be easily separated. For a bilayer windshield, this should be the concave interior surface. It should be noted that at this point instead of a glass back-up plate coated with a release agent, the casting cell can be made with a solid release material such as a smooth, metal element. However, because the casting and curing operation is conducted at elevated temperatures, it is desirable to construct both major walls of the casting cell with a material which has the same thermal coefficient of expansion so as to minimize inducing any optical distortion into the polyesterurethane. Also, because thickness uniformity of the interlayer material is particularly critical in windshield applications, it is desirable to construct the casting cell from two matched windshield elements which have been bent at matched fashion on a bending roll as described above. Thus, the glass back-up plate with a release agent coated on it is preferred to a polished metal plate.

Casting can be accomplished by merely pouring the resin into the cell, but preferably casting is accomplished by pumping a metered quantity of liquid resin into the interlayer space. After the resinous interlayer has been cast, the windshield cell is sealed and the resin is permitted to cure in place. The time and temperature of cure will be from about 230° to 290° F. for a time of about 24 hours. If a catalyst is present in the resin, the cure time can be significantly reduced to about 6 to 8 hours.

As used herein, the terms "bilayer windshield", "bilayer assemblies", and similar terms are intended to mean not only a glazing unit consisting essentially of an outer ply of glass and an exposed inner ply of the described polyesterurethane; but, also to such an assembly adhered to a further ply or plies of glass and/or rigid transparent plastic sheet materials such as polycarbonates and acrylics, as single or multiple layers adhered to the glass portion of the bilayer assembly. Trilayer assemblies as described herein, can also have adhered to it single or multiple plies of rigid, transparent plastic or plastic/glass laminates.

In discussing the properties of the glass laminates described in the examples, reference will be made to several test procedures employed to evaluate the adhesion of the polyesterurethane ply to the glass ply and to measure the resistance of the laminate to penetration by impacting objects. Such tests are now described.

1. — PEEL ADHESION TEST

A convenient test for measuring the adhesion of safety-glass interlayer materials to the glass is known as the peel adhesion test. This test comprises laminating a 6 inch by 12 inch sheet of the interlayer sheeting 30 mils thick between two sheets of glass 6 inches wide and 12 inches long under conventional conditions except that a 5 mil film of poly(ethylene glycol terphthalate), known as MYLAR, is interposed between the interlayer sheet and one of the sheets of glass and a thin metal screen is inserted between the interlayer sheet and the MYLAR film to bond to the surface of the interlayer sheet facing the MYLAR film during lamination. The construction is laminated in an oil autoclave under 200 psi pressure at 275° F. for at least 45 minutes. After the lamination operation, the laminate is cut into strips 6 inches by 1 inch and the MYLAR film and the glass adjacent the MYLAR film are removed. The interlayer film is peeled back from one of the ends of the remaining glass sheet and the amount of pull at 180° necessary to part it from the glass measured using an Instron tensile testing machine. The metal screen bonded to the surface facing away from the glass insures that the force on the interlayer sheet does not extend the polymer instead of serving as a force to separate the polymer from the glass. The adhesion is reported as pounds per inch at a thickness of 30 mils. A peel adhesion value of between about 6 and about 12 pounds per inch is typical for commercial safety glass units using 30 mil polyvinyl butyral sheeting.

2. — IMPACT RESISTANCE

A method of determining the impact resistance of safety glass laminates is known as the 5-pound ball impact test. In this test, a set of ten 12 inch square laminates consisting of two pieces of ⅛ inch thick flat glass and a 30 mil sheet of the interlayer material to be tested are prepared in the appropriate fashion, i.e., by the conventional method for preparing safety glass laminates. Each laminate is, in turn, laid on a horizontal steel frame which supports it by the outer ⅜ inch along all four edges. A 5 pound solid steel ball is then dropped on the supported laminate so that it strikes within 1 inch of the center. If the ball does not pass through the laminate, the result is considered a support. The drop height is increased or decreased 1 foot for the next laminate according to whether the last laminate is graded, respectively, a support or a failure. Testing is continued until the ball has been dropped on all ten laminates and the 50 percent support height is calculated by the well-known "stair case" method. The velocity of a ball dropped from the 50 percent support height is readily calculated at the point of impact by reference to the well-known constant of the acceleration due to gravity. Reference is made to the ANSI Code (Z-26.1 — 1966) for a discussion of this test.

More recently, a new and different way of determining the impact resistance of safety glass laminates has been developed using a Residual Energy Analyzer. The Residual Energy Analyzer comprises an electronic timer and two sensors disposed directly below the position defined by a pair of accurately spaced steel frames and occupied by the laminate to be tested in the path taken by the five pound steel ball. Each sensor comprises an insulated ring to which are mounted six fine wires directed radially inward. The falling ball, which is made of steel, shorts two wires when it passes through the upper sensor, thus activating the timer. When the ball passes through the lower sensor, it deactivates the timer. The transit time ($t$) of the ball as it drops between the two sensors, the drop height ($h_1$) of the ball from its initial position to the plane of impact with the test laminate, the vertical distance from the laminate to the upper sensor ($h_2$) and the vertical distance between the sensors ($h_3$) constitute the raw data from which the penetration energy (U) is calculated from the formula:

$$U = mg\left(h_1 + h_2 + \frac{h_3}{2} - \frac{h_3^2}{2gt^2} - \frac{gt^2}{8}\right)$$

wherein $m$ is the mass of the ball and $g$ is the acceleration of gravity. The ball must be dropped at a height sufficient to insure its passage through the test laminate. Laminates identical in construction to those having a mean break height of 20 feet as determined by the "older staircase" technique produced readings of 21.62 feet when determined from a drop height of 25 feet and 20.71 feet when determined from a drop height of 30 feet. These results indicate good correlation between the older and newer methods of determining mean break height (or mean penetration velocity). Since the newer method requires fewer specimens to be broken for a statistically valid test, it has been used often recently. Test results are reported in miles per hour.

3. — LACERATIVE INJURY RATING

The safety glass industry has developed several test facilities to evaluate the safety of laminated windshields. One type of test facility is a sled of the type illustrated at page 143 of the "Eleventh STAPP Car Crash Conference" proceedings published by the Society of Automotive Engineers, Inc., New York, New York in 1967.

The typical facility for testing laminated windshields described in this publication comprises a full scale automotive windshield test machine that pneumatically fires a sled (gross load approximately 500 pounds including the 50th percentile Alderson or Sierra dummy) to a preselected speed. The sled and its actuating cylinder are stopped hydraulically. The sled is provided with a bucket-type seat supporting the dummy and is accelerated to a desired impact speed with a pneumatic cylinder which disengages from the sled before the latter engages a decelerating cylinder. Electronic measurement apparatus measures the sled velocity in the interval between its disengagement from the accelerating cylinder and its engagement with the decelerating cylinder. The sled is brought to a stop at the desired point by the decelerating cylinder.

When the sled stops, the dummy continues on in a manner duplicating a barrier-type impact in which the vehicle is stopped before the passenger impacts vehicle components. Another way of interpreting the results is to consider the relative velocity at impact and equate it to other types of accidents in which such relative velocities are achieved.

A windshield frame is mounted above the track along which the sled travels. The windshield mount is used to assure the same mounting conditions or resiliency, frame support, angle of glass, and the surrounding components. This insures the reasonable reality of test conditions. The apparatus is so arranged that the forehead of the dummy engages the test windshield 5 to 6 inches below its upper mounting in the plane of glass. The windshields are mounted in a frame using adhesive glazing similar to most domestic, commercial production mountings. This also facilitates replacement of test windshields.

Biaxial accelerometers are mounted immediately behind the forehead area of the head of the dummy to measure the deceleration at impact. The decelerations are then compared with the deceleration injury curve to determine whether concussive injury is likely to occur. These comparisons in terms of Severity Index will be described later.

A means of determining soft-tissue injury, and particularly minor soft-tissue injury, has been achieved by covering the head of the dummy with two layers of a chamois or goat skin to simulate human skin. Shallow scratches to the outer layer only are classed as "minor" and given an injury rating of 1, whereas deep lacerations through both layers of the simulated skin are considered as "serious" and given an injury rating of 5, with intermediate degrees of damage rated 2, 3 or 4, depending upon the severity of the damage, such as, for example, 2 for a few shallow cuts to the top layer only, 3 for cuts and gouges of the top layer, and 4 for many cuts and gouges, a few of which are in both layers.

4. — SEVERITY INDEX

A factor known as the Severity Index has become identified with relative safety of windshields as determined by impact tests using the 50th percentile dummy whose face is covered with two layers of moist chamois on the test sled apparatus. The Severity Index (S.I.) is calculated by the Gadd equation:

$$S.I. = \int_0^t A^{2.5} dt ,$$

wherein A is acceleration in units of gravity and dt is the time differential in milliseconds between the moment of impact of the head of the dummy with the test windshield to the time a horizontal accelerometer attached to the dummy head indicates a sudden negative load. This value is determined for each millisecond during the time interval and the values integrated for the whole time period. In other words, the Severity Index is calculated from the area under a curve resulting from a plot of acceleration forces acting on the dummy head as a function of time. A Severity Index of 1,000 has been suggested as the injury threshold for head impacts. In general, the Severity Index increases with velocity of impact.

The 22-pound falling headform test can also be used to calculate a Headform Severity Value (HSV). In this test, the headform is dropped from a predetermined height onto a rigidly held laminate in much the same manner as the 5 pound ball impact test. The measurement of the deceleration on the headform upon impact is determined by a linear accelerometer mounted in the headform. The vertical deceleration in g's (32 feet per second$^2$) are measured as a function of time. The measurements are plotted graphically with deceleration being plotted as the ordinate and the time in milliseconds being plotted as the abscissa. The Headform Severity Value is calculated from such a plot using the above Gadd Equation.

For a more thorough description of Severity Index, see "Human Tolerance to Impact Conditions as Related to Motor Vehicle Design" by the Society of Automotive Engineers Handbook Supplement J885, 1964; and "Use of a Weighted-Impulse Criteria for Estimating Injury Hazard" by J. P. Danforth and C. W. Gadd from the conference proceedings 10th *Stapp Car Crash Conference* reprinted by the Society for Automotive Engineers, December 1966. Also, see "Laboratory Studies on Laminated Safety Glass and Installations on Performance" by R. G. Rieser and J. Chabal, presented at the 13th Stapp Car Crash Conference, reprinted by the Society for Automotive Engineers, December 1969.

The present process is more particularly described in the following Examples which are intended as illustrative only since numerous modifications and variations therein will be apparent to those skilled in the art.

EXAMPLE 1

Into a 2-liter glass kettle was introduced poly(-butanediol-1,4 adipate)diol having a number average molecular weight of about 584. This polyester polyol, which, upon analysis, was found to contain about 25 parts per million of butyl stannoic acid and about 4.5 wt. percent residual unreacted 1,4-butanediol was degassed for about 1 hour at 137° F. under a vacuum of 2-3 millimeters of mercury. Hylene W (4,4'-methylene-bis-(cyclohexyl isocyanate), which was preheated to 137° F. in a vacuum oven (60 millimeters of mercury) was added to the polyester in the glass kettle in an amount equivalent to an NCO/OH ratio of 1/1. The mixture of poly(butanediol-1,4 adipate) diol and Hylene W was degassed for about 6 minutes at 2 millimeters of mercury whereupon the vacuum was broken with dry nitrogen and the degassed mixture cast into glass cells having a nominal space of about 30 mils. The glass cells were fabricated from 12 inch by 12 inch by ⅛ inch plate glass panels which were gasketed on three sides. The cells were preheated in an oven to 290° F. before being filled with the degassed mixture from the glass kettle. The filled cells were placed in an oven for 24 hours at 290° F. After curing for this period and at such temperature, the cells were taken out and permitted to cool to room temperature and aged for about 1 week under atmospheric laboratory conditions, i.e., atmospheric pressure and about 70° F. The urethane content of the polyesterurethane was calculated to be 13.9 percent.

Glass laminates prepared in the aforementioned manner were tested for impact resistance by dropping a 5 pound steel ball from various heights with the laminates at test temperatures of 0° F., 70° F. and 120° F. The mean penetration velocity (corrected to 30 mils thickness of interlayer) of the laminates at 0° F., 70° F. and 120° F. were 24.5 miles mph, greater than 25.5 mph and 15.5 mph, respectively. The aforementioned data reported for 70° F. indicates that the number of samples tested at that temperature (three) did not result in failure of the laminate at the highest height from which the 5 pound ball was dropped, which height corresponded to 25.5 mph.

EXAMPLE 11

The procedure of Example I was repeated except that the polyesterurethane material was prepared by reacting a mixture of (a) poly(butanediol-1,4 adipate) diol having a number average molecular weight of about 1990, (b) 1,4-butanediol and (c) Hylene W diisocyanate in a mole ratio of 1.0/2.7/3.7, respectively. The mixing temperature of the reactants was 160° F. rather than 137° F. in order to avoid the production of an opaque polyesterurethane. The urethane content of the polyurethane was calculated to be 13.7 percent.

Test glass laminates were prepared by the cast-in-place process and tested as described in Example I. The mean penetration velocity at 0° F., 70° F., and 120° F. (corrected to 30 mils thickness) were, respectively 25.5 mph, 25 mph, and about 16 mph.

The data of Example I and Example II show that substantially equivalent performance in impact resistance is obtained by using the polyesterurethane composition of Example I as the polyesterurethane composition of Example II.

EXAMPLE III

The procedure of Example I was repeated except that a poly(butanediol-1,4 adipate) diol of a number average molecular weight of about 459 was used to prepare the laminates. The polyester composition contained about 100 ppm of butyl stannoic acid catalyst and about 6.7 wt. percent residual unreacted 1,4-butanediol. Test glass laminates containing the resulting polyesterurethane were tested as described in Example I and had an impact resistance at 0° F., 70° F., and 120° F. of 9 mph, 22 mph, and 17 mph, respectively. These laminates provided good impact resistance at 70° F. and 120° F.

EXAMPLE IV

The preparative and test procedure of Example I were repeated except that a poly(butanediol-1,4 adipate) diol having a number average molecular weight of about 529 was used to prepare the polyesterurethane interlayer material. The polyester composition contained about 100 ppm of butyl stannoic acid catalyst and about 5.4 weight percent residual unreacted 1,4-butanediol. Test glass laminates containing such polyesterurethane had an impact resistance at 0° F., 70° F., and 120° F. (corrected to 30 mils) of 24 mph, 24 mph, and 16 mph, respectively. Such laminates exhibited substantially equivalent performance to the laminates prepared and tested in Examples I and II.

EXAMPLE V

The preparative and test procedure of Example I was repeated except that the polyesterurethane interlayer composition was prepared using poly(butanediol-1,4 adipate) diol having a number average molecular weight of about 774. The polyester composition contained about 25 ppm butyl stannoic acid and about 2.7 weight percent residual unreacted 1,4-butanediol. Test glass laminates containing said polyesterurethane material had an impact resistance at 0° F., 70° F., and 120° F. of 24 mph, less than 18 mph and 14.5 mph, respectively. These laminates exhibited good performance at 0° F., with a slightly poorer performance at 70° and 120° F. than the polyurethane materials used in Examples I and II.

EXAMPLE VI

Glass plates 14 inches by 14 inches by ¼ inch were used to fabricate glass cells having a nominal spacing of about 40 mils. The glass cells were gasketed on three sides. Each inside face of the glass cell was coated with a release film of TEFLON.

Using the procedure of Example I, a mixture of poly(butanediol-1,4 adipate) diol having a number average molecular weight of about 529 was mixed with (in an amount equal to an NCO/OH ratio of about 1/1) Hylene W diisocyanate together with about 0.5 weight percent (based on the total weight of reactants) of Z-6040 silane additive, which was added to give the polyesterurethane sheet material high adhesion under high humidity conditions, was poured into the glass cells. The polyester composition contained about 50 ppm butyl stannoic acid and about 5.49 weight percent residual unreacted 1,4-butanediol. After curing and cooling, the glass cells were separated to yield free-cast sheets, which were aged overnight in a low (10–20 percent) humidity (conditioning) room at 65°–70° F.

The aforementioned free-cast sheets were pieced together between two sheets of 2 feet by 3 feet by ⅛ inch plate glass, one of which had a 0.5 mil thick TEDLAR coating on the surface. Laminates prepared in this manner were placed in individual plastic bags which were evacuated and the plastic bags containing the laminate placed in an oil autoclave, which was brought to a temperature of 285° F. and a pressure of 200 psi. The laminates were maintained at these conditions for ½ hour.

After removing the laminates from the oil autoclave and the plastic bag, the plates having the TEDLAR surface were removed to provide bilayer glass laminates of a plate glass sheet 2 feet by 3 feet by ⅛ inch to which was adhered the aforementioned polyesterurethane material. These laminates were aged for 1 week in a conditioning room (65°–70° F; 10-20% relative humidity) and tested at 30° F., 70° F and 110° F. with a 22 pound headform, which was allowed to drop on the polyesterurethane side of the laminate from a height equivalent to an impact of 19 mph. The results are tabulated in Table I.

TABLE I

| Temperature | 30° F. | 70° F. | 110° F. |
|---|---|---|---|
| Av. HSV | 265 | 185 | — |
| Observations | No Penetration; No Tear | No Penetration; 1" Tear | Penetration |

The data of Table I show that acceptable performance of the bilayer glass laminate occured at 30° F. and 70° F.; but that penetration occurred at 110° F.

EXAMPLE VII

Using the procedure of Example I, a mixture of poly (butanediol-1,4 adipate) diol having a number average molecular weight of about 530 and Hylene W diisocyanate (NCO/OH ratio of about 1/1) was used to prepare the polyesterurethane. The poly(butanediol 1,4 adipate) diol contained about 200 ppm butyl stannoic acid and about 5.5 weight percent residual unreacted 1,4-butanediol. To the polyester-diisocyanate mixture was added 0.03 weight percent of stearyl acid phosphate and 0.20 weight percent of Z-6040 silane additive to control the adhesion of the polyurethane to the glass sheet. The polyesterurethane sheets were prepared by the cast-in-place method of Example VI and pieced together to form a 24 inch by 36 inch laminate. Bilayer laminates of a plate glass sheet 24 inch by 36 inch by ⅛ inch to which was laminated an inner liner of the polyesterurethane sheet of from 0.035–0.040 inches thick were prepared in accordance with the procedure of Example VI.

A laminate prepared in accordance with the aforementioned procedure was tested for peel adhesion and found to have an adhesion of 4–5 pounds/inch. The laminate was then exposed to conditions of 100 percent relative humidity at 120° F. After 40 days exposure, the test was terminated and the peel adhesion level again measured. The peel adhesion remained at the 4–5 pound/inch level.

Laminates prepared by the aforementioned procedure were aged for 1 week in a dry room and tested at 30° F., 70° F. and 110° F. by dropping a 22 pound headform on the polyesterurethane side of the laminate from a height equivalent to an impact of 19 mph. The results are tabulated in Table II.

TABLE II

| Temperature | 30° F. | 70° F. | 110° F. |
|---|---|---|---|
| Av. HSV | 276 | 159 | 106 |
| Observations | No Penetration; No tear | No Penetration; No tear | No Penetration; No tear |

A 24 inch by 36 inch bilayer glass laminate prepared with polyvinyl butyral and a similar laminate prepared with a polyesterurethane similar to that of Example II were also tested by dropping a 22 pound headform on the laminate assembly in the same manner. The polyvinyl butyral laminate was prepared by laminating preformed polyvinyl butyral sheet to a glass sheet in the manner described in Example VI. The polyesterurethane (Example II composition) comparative sample was prepared also by laminating a preformed sheet to a glass sheet in the manner described in Example VI. At 70° F., the average headform severity value of the polyvinyl butyral laminate was 189 while that of the comparative polyesterurethane sheet material (Example II composition) was 235.

The aforementioned data shows that the polyesterurethane laminate prepared with about a 530 number average molecular weight polyester performed, as determined by headform severity value, better than the polyesterurethane prepared from the 2,000 number average molecular weight polyester or one prepared with commercially available polyvinyl butyral.

EXAMPLE VIII

The preparative and test procedure of Example VII was repeated except that a polyesterurethane prepared from poly(butanediol-1,4 adipate) diol having a number average molecular weight of about 500 and Hylene W diisocyanate (NCO/OH ratio of about 0.97). The urethane content was calculated to be about 15 percent. Bilayer glass laminates prepared, as previously described, were tested at 30° F., 70° F., and 110° F., by dropping a 22 pound headform on the polyesterurethane side of the laminate from a height equivalent to an impact of 19 mph. The results are tabulated in Table III.

TABLE III

| Temperature | 30° F. | 70° F. | 110° F. |
|---|---|---|---|
| Av. HSV | 210 | 366 | — |
| Observations | No Penetration No tear | No Penetration No tear | Average 5.3 inches tear. |

EXAMPLE IX

Poly(butanediol-1,4 adipate) diol having a number average molecular weight of about 570, about 5 ppm butyl stannoic acid and about 4.5 weight percent residual unreacted 1,4-butanediol was mixed with Hylene W diisocyanate (at an NCO/OH ratio of about 1/1) and cured in a TEFLON lined reaction vessel in a 143° C. air circulating oven for 20 hours. The solid polyurethane reaction product was allowed to cool to room temperature, reduced in size and calendered into sheet about 30 mils thick. The inherent viscosity of the calendered sheet was 1.12. This polyurethane sheet product was laminated between 12 inch × 12 inch × ⅛ inch plate glass sheets and tested for impact resistance with the 5-pound steel ball drop test at 0° F., 70° F., and 120° F. The impact resistance recorded was 30 mph (33 mils), 32 mph (35 mils), and 18 mph (35 mils), respectively. The actual thickness of the laminate tested is listed adjacent the mean penetration velocity values.

EXAMPLE X

A polyesterurethane was prepared by reacting a poly(butanediol-1,4 adipate)diol having a number average molecular weight of 529 and containing about 100 ppm butyl stannoic acid and about 5.5 weight percent unreacted residual 1,4-butanediol with Hylene W diisocyanate (at an NCO/OH ratio of 1/1) at 238° F. for 24 hours. To increase adhesion, 0.20 weight percent, based on total reactant weight, of Z-6040 silane was added to the polyester before the reaction.

Strips about 40 mils thick of the aforementioned polyesterurethane were exposed in a Fade-Ometer and Weather-Ometer and compared to a polyesterurethane of the type described in Example II. Results are tabulated in Table IV.

The test for Fade-Ometer exposure was conducted according to A.S.T.M. G-25-70 — Method A with free films of approximately 40 mils thicknesses. Strips of 2½ inches by 6 inches were secured in metal frames and mounted in the Fade-Ometer, manufactured by Atlas Electric Devices Company, Type FDA-R, Serial Number FO-2951. Initial appearance of the film was noted and recorded. Then the film is exposed to ultraviolet light radiation from a carbon arc light source enclosed in a fused silica glass globe. The black panel temperature of the Fade-Ometer was 140° F. The film is examined at intermittent time intervals and any visible changes in the film noted. Examples of such visible changes would be discoloration, crazing and hazing.

The test for Weather-Ometer exposure was conducted in accordance with A.S.T.M. D-1499-64. Free films of 2½ inches by 6 inches by 40 mils thickness were exposed to ultraviolet light radiation from a twin carbon arc light source enclosed in a fused silica glass globe. The black panel temperature of the Weather-Ometer was 140° F. and the films were mounted in a rotating carriage in the Weather-Ometer and subject to an intermittent deionized water spray (70° F.) about every minute. The Weather-Ometer used for the evaluations listed above was a Weather-Ometer Type DMC, Serial Number WO-1305.

TABLE IV

| Polyesterurethane | Example X | Example II (Type) |
|---|---|---|
| Fade-Ometer | | |
| Exposure, hours | 1215 | 1366 |
| Observation | No visual change | No visual change |
| Weather-Ometer | | |
| Exposure, hours | 1195 | 1372 |
| Observation | No visual change | No visual change |

Strips of the polyesterurethane of this example and a strip of polyesterurethane of the type described in Example II were stored in both a desiccator and in a conditioning room held at 65°–70° F. at 10–20 percent relative humidity for 14 days. No visual change was observed for the polyesterurethane of this example; however, a white film (bloom) appeared on the surface of the polyesterurethane having the composition described in Example II stored in both the desiccator and the conditioning room. Tests with polyesterurethane strips prepared in accordance with this Example X have shown no formation of a white film (bloom) after 47 days exposure, at which time the test was terminated.

Bilayer glass laminates (12 inches × 12 inches) prepared with the polyesterurethane of this Example X and a polyesterurethane similar to the composition of Example II were stored under conditions of 100 percent relative humidity and 120° F. After one day, there was a complete loss of adhesion of the polyesterurethane having the composition analogous to Example II; however, after 25 days, the adhesion of the polyesterurethane of this Example X was still acceptable.

The data of the Example show that polyesterurethanes of this invention exhibit excellent weathering characteristics and good adhesion to glass under severe temperature and humidity conditions.

Although the present process has been described with reference to specific details of certain embodiments thereof, it is not intended that such details be regarded as limitations upon the scope of the invention except as and to the extent that they are included in the accompanying claims.

We claim:

1. An optically clear laminate, comprising a sheet of relatively rigid, transparent material bonded to a sheet of thermoplastic, transparent polyesterurethane consisting essentially of the reaction product of (a) hydroxy-terminated polyester composition that is the esterification reaction product of an aliphatic dicarboxylic acid containing from 4 to 10 carbon atoms and an aliphatic diol containing from 4 to 8 carbon atoms, said polyester composition having a number average molecular weight of between about 500 and about 800 and containing no more than about 7 percent by weight residual, unreacted aliphatic diol, and (b) dinuclear cycloaliphatic diisocyanate, the mole ratio of diisocyanate to polyester being such that said polyesterurethane is substantially free of unreacted isocyanate groups.

2. The laminate of claim 1 wherein the dicarboxylic acid contains from 6 to 9 carbon atoms and the aliphatic diol contains 4 carbon atoms.

3. The laminate of claim 2 wherein the dicarboxylic acid contains 6 carbon atoms.

4. The laminate of claim 2 wherein the dicarboxylic acid contains 7 carbon atoms.

5. The laminate of claim 1 wherein the polyester has a number average molecular weight of from about 520 to about 585.

6. The laminate of claim 5 wherein the polyester contains no more than about 5.5 weight percent residual, unreacted aliphatic diol.

7. The laminate of claim 1 wherein the diisocyanate is 4,4'-methylene-bis-(cyclohexyl isocyanate).

8. The laminate of claim 7 wherein the diisocyanate has a stereoisomer content of about 55 percent trans and about 45 percent cis.

9. The laminate of claim 7 wherein the polyesterurethane sheet is an interlayer between two sheets of glass.

10. The laminate of claim 1 wherein the rigid, transparent material is glass.

11. The laminate of claim 1 wherein the relatively rigid transparent sheet is selected from the group of polycarbonate, polyester, acrylic or glass.

12. The laminate of claim 11 wherein the relatively rigid transparent sheet is glass and the polyesterurethane is bonded to and between two sheets of glass.

13. The laminate of claim 1 wherein the laminate comprises a glass sheet bonded to a sheet of the polyesterurethane which has on its exposed surface a thin abrasion resistant protective coating.

14. An optically clear glass laminate, comprising a glass sheet bonded to a sheet of thermoplastic, transparent polyesterurethane consisting essentially of the reaction product of (a) hydroxy-terminated polyester composition that is the esterification reaction product of an aliphatic dicarboxylic acid containing from 4 to 10 carbon atoms and an aliphatic diol containing from 4 to 8 carbon atoms, said polyester composition having a number average molecular weight of from about 500 to about 650 and containing no more than 6 percent by weight of residual, unreacted aliphatic diol, and (b) dinuclear cycloaliphatic diisocyanate, the mole ratio of diisocyanate to polyester being such that the polyesterurethane is substantially free of unreacted diisocyanate groups.

15. The laminate of claim 14 wherein the mole ratio of diisocyanate to polyester is from about 0.9:1 to about 1.1:1.

16. The laminate of claim 14 wherein the aliphatic diol is hydroxy-terminated.

17. The laminate of claim 14 wherein the aliphatic dicarboxylic acid contains from 6 to 9 carbon atoms and the aliphatic diol is 1,4-butanediol.

18. The laminate of claim 17 wherein the polyester has a number average molecular weight of from about 520 to about 585.

19. The laminate of claim 10 wherein the cycloaliphatic diisocyanate is 4,4'-methylene-bis-(cyclohexyl isocyanate).

20. The laminate of claim 19 wherein the dicarboxylic acid is adipic acid.

21. The laminate of claim 20 wherein the polyurethane sheet is an interlayer between two sheets of glass.

* * * * *